United States Patent
Martin et al.

(10) Patent No.: US 7,398,523 B2
(45) Date of Patent: Jul. 8, 2008

(54) ADAPTIVE CLASS LOADING

(75) Inventors: Brian Keith Martin, Cary, NC (US); Daniel John Moravec, Rochester, MN (US); Thomas Edward Musta, Rochester, MN (US); Eric Jon Van Norman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/921,592

(22) Filed: Aug. 19, 2004

(65) Prior Publication Data

US 2006/0041880 A1 Feb. 23, 2006

(51) Int. Cl.
G06F 9/44 (2006.01)

(52) U.S. Cl. .............. 717/166; 717/163; 719/330; 718/1

(58) Field of Classification Search ........ 717/166, 717/163; 719/330; 718/1
See application file for complete search history.

(56) References Cited

U.S. PATENT DOCUMENTS

| | | | | |
|---|---|---|---|---|
| 6,083,279 | A * | 7/2000 | Cuomo et al. ............... | 717/118 |
| 6,430,570 | B1 * | 8/2002 | Judge et al. ............ | 707/103 R |
| 6,484,313 | B1 | 11/2002 | Trowbridge et al. | |
| 6,584,612 | B1 * | 6/2003 | Mueller et al. .............. | 717/166 |
| 6,631,521 | B1 * | 10/2003 | Curtis ........................ | 717/175 |
| 6,654,954 | B1 | 11/2003 | Hicks | |
| 6,829,772 | B2 * | 12/2004 | Foote et al. ................ | 719/330 |
| 6,862,728 | B2 * | 3/2005 | Darnell et al. ............. | 717/148 |
| 6,901,589 | B2 * | 5/2005 | White ........................ | 717/166 |
| 6,931,638 | B2 * | 8/2005 | Daynes et al. ................ | 718/1 |
| 7,093,243 | B2 * | 8/2006 | Bailey et al. ................ | 717/166 |
| 7,240,341 | B2 * | 7/2007 | Plummer et al. ............ | 717/148 |
| 7,243,346 | B1 * | 7/2007 | Seth et al. ................... | 717/163 |

OTHER PUBLICATIONS

JAVA!, Tim Richey, Chapters 1,2,6,7,13 and 14, Sep. 22, 1995.*
Design, Implementation and Evaluation of Adaptive Recompilation with On-Stack Replacement, Stephen J. Fink, ACM, Mar. 2003, pp. 241-252.*
A Dynamic Optimization Framework for a JAVA Just-In-Time Compiler, Toshio Suganuma et al, ACM, 2001, pp. 180-194.*
JAVA Annotation-Aware Just-In-Time (AJIT) Compilation System, Ana Azevedo et al, ACM, 1999, pp. 142-151.*
Partial Method Compilation Using Dynamic Profile Information, John Whaley, ACM, 2001, p. 166-179.*
Design, Implementation and Evaluation of Optimizations in a Just-In-Time compiler, Kazuaki Ishizaki et al, ACM, 1999, pp. 119-128.*

(Continued)

Primary Examiner—Todd Ingberg
(74) Attorney, Agent, or Firm—Owen J. Gamon (57) ABSTRACT

A method, apparatus, system, and signal-bearing medium that, in an embodiment, determine the classes that are needed during a first invocation of an application and preload those classes during a subsequent invocation of the application. In various embodiments, the classes may be preloaded if they are within a specified package, if they were needed greater than a threshold number of times, if the class path did not change between the first invocation and the subsequent invocation, or if the jar files the contain the classes are in a class path. In this way, an embodiment of the invention may increase the performance of class preloading.

8 Claims, 9 Drawing Sheets

OTHER PUBLICATIONS

Towards Automatic Construction of Staged Compilers, Mathai Philipose et al, ACM, 2002, pp. 113-125.*

Calpa: A Tool for Automating Selective Dynamic Compilation, Markus Mock et al, IEEE, 2000, pp. 1-12.*

JAVA: The First 800 Days, Sun Microsystems, 70 pages, printed Feb. 2, 2002.*

Focus On OpenView, Nathan J. Muller, p. 265, 1995.*

* cited by examiner

ADAPTIVE CLASS LOADING

FIELD

An embodiment of the invention generally relates to computers. In particular, an embodiment of the invention generally relates to adaptive class loading for object oriented programs.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware components (such as semiconductors, integrated circuits, programmable logic devices, programmable gate arrays, power supplies, electronic card assemblies, sheet metal, cables, and connectors) and software, also known as computer programs, which are written in a programming language.

Modern programming languages use a number of approaches to dynamically load interdependent components of executable code, such as plug-ins and bundles. For example, languages such as C and C++, which compile source code to native code, generally use a linking process after the source code is compiled. This linking process merges code from separately compiled source files, along with shared library code, to form an executable program. But, other languages, e.g., the Java language, operate differently. With the Java language, the classes generated by the compiler generally remain just as they are until they are loaded into a JVM (Java Virtual Machine).

Rather than a separate step, linking classes is part of the job performed by the JVM when it loads them into memory. This adds some overhead as classes are initially loaded, but also provides a high level of flexibility for Java applications. For example, applications can be written to use interfaces with the actual implementations left unspecified until run time. This late binding approach to assembling an application is used extensively in the Java platform, with servlets being one common example.

Java classes are typically loaded only when needed, which is sometimes called lazy or on-demand loading. Another technique is to load classes on startup, but this technique does not load all required classes; instead only a small subset of classes are typically loaded at startup. Each class that is loaded may have other classes that it depends on, so the loading process is recursive. When a class is loaded and initialized, the JVM decodes the binary class format, checks compatibility with other classes, verifies the sequence of bytecode operations, and constructs a java.lang.Class instance to represent the new class. This Class object becomes the basis for all instances of the new class created by the JVM. The Class object is also the identifier for the loaded class itself; multiple copies of the same binary class can be loaded in a JVM, each with its own Class instance. Even though these copies all share the same class name, they will be separate classes to the JVM. Thus, the processing needed when a class is loaded is extensive.

Because of the extensive processing needed to load classes, the performance of an application can be slow until all the required classes are loaded. Without a better way to handle class preloading, applications will continue to suffer from poor performance. Although the aforementioned problems have been described in the context of Java-based applications, they may occur in the context of any programming languages that uses class loading.

SUMMARY

A method, apparatus, system, and signal-bearing medium are provided that, in an embodiment, determine the classes that are needed during a first invocation of an application and preload those classes during a subsequent invocation of the application. In various embodiments, the classes may be preloaded if they are within a specified package, if they were needed greater than a threshold number of times, if the class path did not change between the first invocation and the subsequent invocation, or if the jar files the contain the classes are in a class path. In this way, an embodiment of the invention may increase the performance of class preloading.

DETAILED DESCRIPTION

In an embodiment, a class loader interprets statements in a first invocation of an application to find classes that are needed. In a subsequent invocation of the application, the class loader preloads the classes that were previously found. In various embodiments, the classes may be preloaded if they are within a package specified by a user, if they were needed greater than a threshold number of times, if the class loader's class path did not change between the first invocation and the subsequent invocation, or if the jar files the contain the classes are in the class loader's class path.

Figure 1:
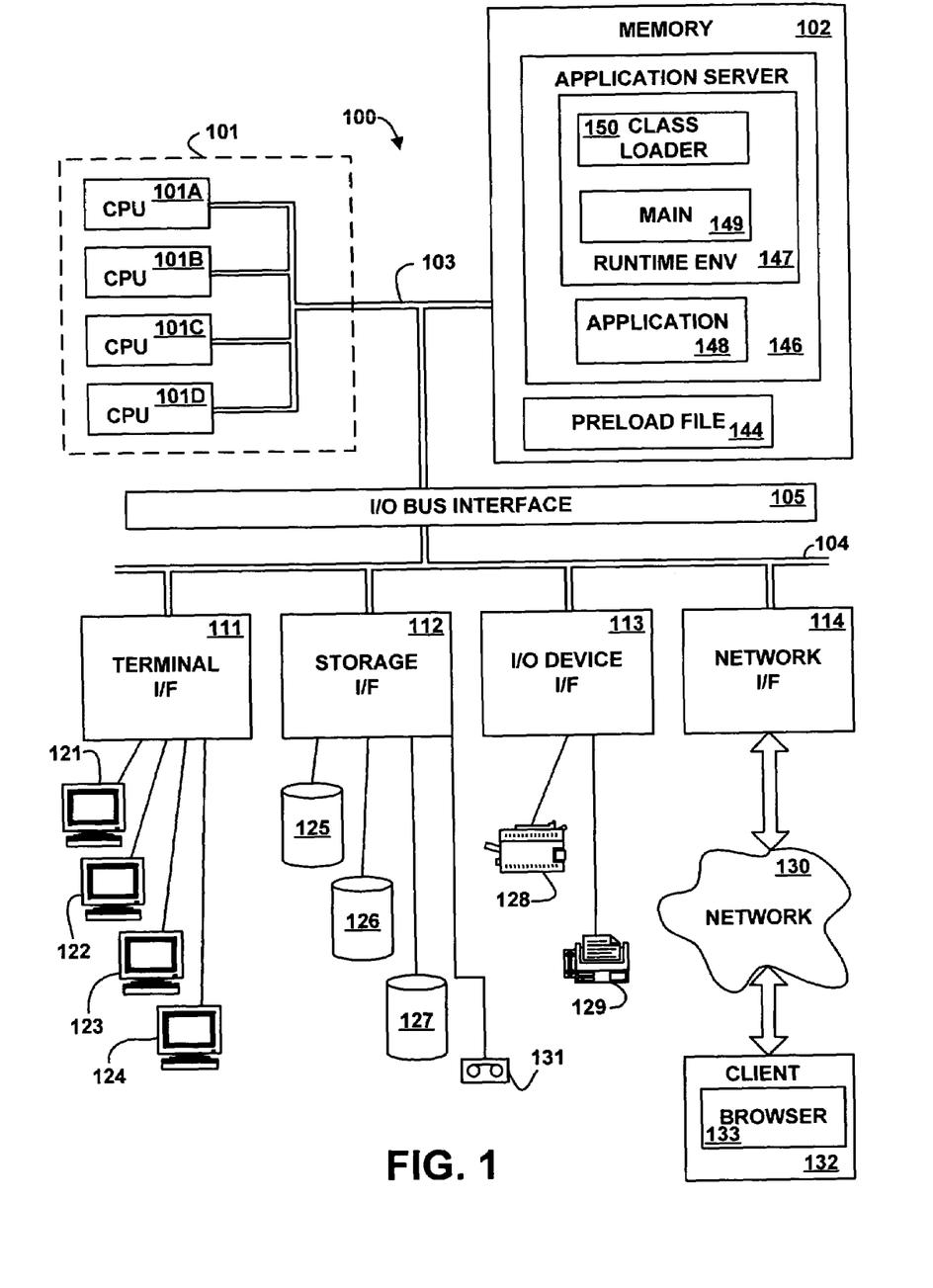
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to clients 132 via a network 130, according to an embodiment of the present invention. The major components of the computer system 100 include one or more processors 101, main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment, the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a preload file 144 and an application server 146. Although the preload file 144 and the application server 146 are illustrated as being contained within the memory 102 in the computer system 100, in other embodiments, some or both of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the preload file 144 and the application server 146 are both illustrated as being contained within the memory 102 in the computer system 100, they are not necessarily both completely contained in the same storage device at the same time.

The application server 146 includes a runtime environment 147 and an application 148. The runtime environment 147 includes a main 149 and a class loader 150. In an embodiment, the runtime environment 147 may be an enhanced JVM, but in other embodiments any appropriate runtime environment may be used. The application 148 includes statements that request the loading of classes and is further described below with reference to FIG. 3.

The class loader 150 dynamically loads classes for the application 148. The class loader 150 is responsible for searching for a particular class and making that class available to the runtime environment 147 if found. Once loaded, each class object retains a reference to the class loader 150 with which it was loaded. In an embodiment, class loading is based on a parent-first class loading delegation model, wherein a class loader 150 first delegates the class loading responsibility to its immediate parent class loader 150. If neither that parent class loader 150 nor any of its ancestors, in turn, are able to locate the class, then the initial class loader 150 is used for the loading operation. Inheritance in the class loader 150 chain is under control of the programmer, who may specify an explicit parent relationship when creating a new class loader 150. In another embodiment, a parent-last or any other appropriate class loading model may be used. Each time a class loader 150 is created, it is associated with one or more locations (such as file tree structures and archives) that it will be searching for classes. Thus, multiple class loaders 150 may exist, and each may have its own class path, or in another embodiment only one class path may be used for all of the class loaders 150.

In an embodiment, the main 149 and the class loader 150 include instructions capable of executing on the processor 101 or statements capable of being interpreted by instructions executing on the processor 101 to present the user interface as further described below with reference to FIG. 2, to interpret the application 148, as further described below with reference to FIG. 3, to manipulate the preload file 144 as further described below with reference to FIG. 4, and to perform the functions as further described below with reference to FIGS. 5, 6, 7, 8, and 9. In another embodiment, the main 149 and/or the class loader 150 may be implemented in microcode. In yet another embodiment, the main 149 and/or the class loader 150 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiments, many other such devices may exist, which may be of differing types.

The network interface 114 provides one or more communications paths from the computer system 100 to other digital devices and computer systems, e.g., the client 132; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact, the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments, some or all of the I/O devices are connected directly to one or more system I/O buses.

The computer system 100, depicted in FIG. 1, has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In an embodiment, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line, cable, or bus. In another embodiment, the network 130 may support the Ethernet IEEE (Institute of Electrical and Electronics Engineers) 802.3x specification.

In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 may further include some or all of the hardware components previously described above for the computer system 100. Although only one client 132 is illustrated, in other embodiments any number of clients may be present. The client 132 may include a browser 133 for rendering pages received from the computer system 100.

It should be understood that FIG. 1 is intended to depict the representative major components of the computer system 100, the network 130, and the clients 132 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
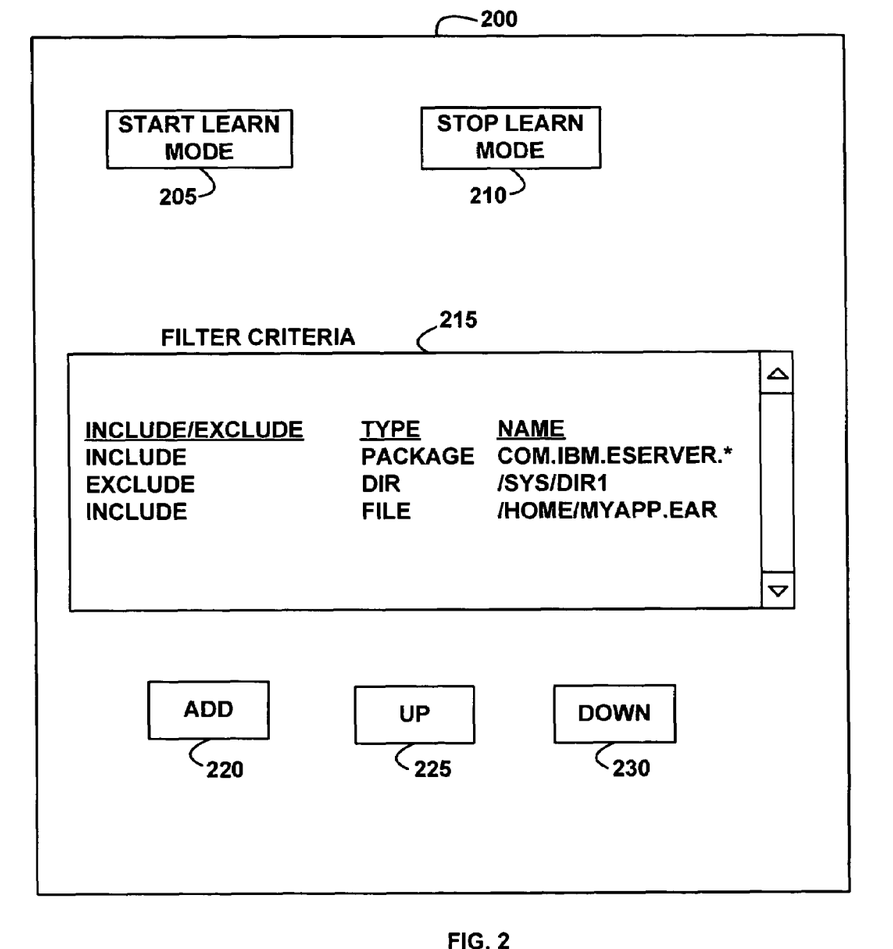
FIG. 2 depicts a block diagram of an example user interface, according to an embodiment of the invention.

FIG. 2 depicts a block diagram of an example user interface 200, according to an embodiment of the invention. In an embodiment, the example user interface 200 may be created by the browser 133, in response to interpreting control tags and data in a page downloaded from the computer system 100. In various embodiments, the client 132 or a user at the client desires to access the application 148 at the computer system 100 and is given the ability via the user interface 200 to control the way the class loader 150 loads the application's classes. In other embodiment, the user interface 200 may be presented to a user at the computer system 100. In another embodiment, the user interface 200 may be optional, not present, or not used, and the class loader 150 may perform the class loading without user input.

The example user interface 200 includes a start learn mode button 205, a stop learn mode button 210, a filter criteria 215, an add button 220, an up button 225, and a down button 230. The start learn mode button 205, when selected, requests the class loader 150 to learn which classes to preload based on an invocation of the application 148. The stop learn mode button 210, when selected, requests the class loader 150 to stop learning which classes to preload, after which a subsequent invocation of the class loader 150 may use the learning that the class loader 150 did on the previous invocation. The filter criteria 215 allows the user to specify package(s), directories, or files that contain classes to preload or exclude from preloading, and in an embodiment, wild cards for inclusion or exclusion (e.g., "*" is a typical wild card character, but any others may be used) may be supported by the user interface 200.

The add button 220 allows a user to request adding include/exclude entries to the filter criteria 215. The up button 225 and the down button 230 allow the user to request ordering of the include/exclude entries in the filter criteria 215.

The processing for the buttons 205 and 210 and the filter criteria 215 is further described below with reference to FIG. 5. The user interface elements illustrated in FIG. 2 are examples only, and in other embodiments any appropriate user interface elements may be used.

Figure 3:
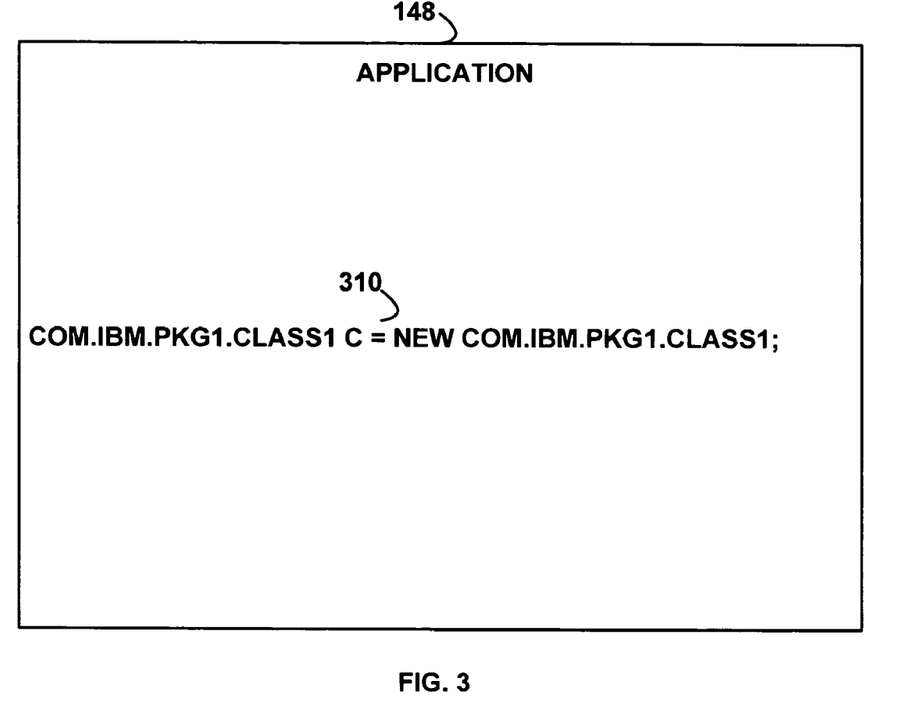
FIG. 3 depicts a block diagram of an example application, according to an embodiment of the invention.

FIG. 3 depicts a block diagram of an example application 148, according to an embodiment of the invention. In various embodiments, the application 148 is an program that serves requests from the client 132 or serves requests from a user of the computer system 100. In another embodiment, the application 148 is part of an operating system for the computer system 100. In another embodiment, the application 148 is any software or computer program that contains statements or instructions that need classes.

The example application 148 includes any number of statements, such as the statement 310. The statement 310, when interpreted or executed, requests the loading of a class, such as the class "class1" in the package "pkg1," as illustrated in the example of statement 310. But, in other embodiments any appropriate statements with any appropriate class names, with or without packages, may be used.

Figure 4:
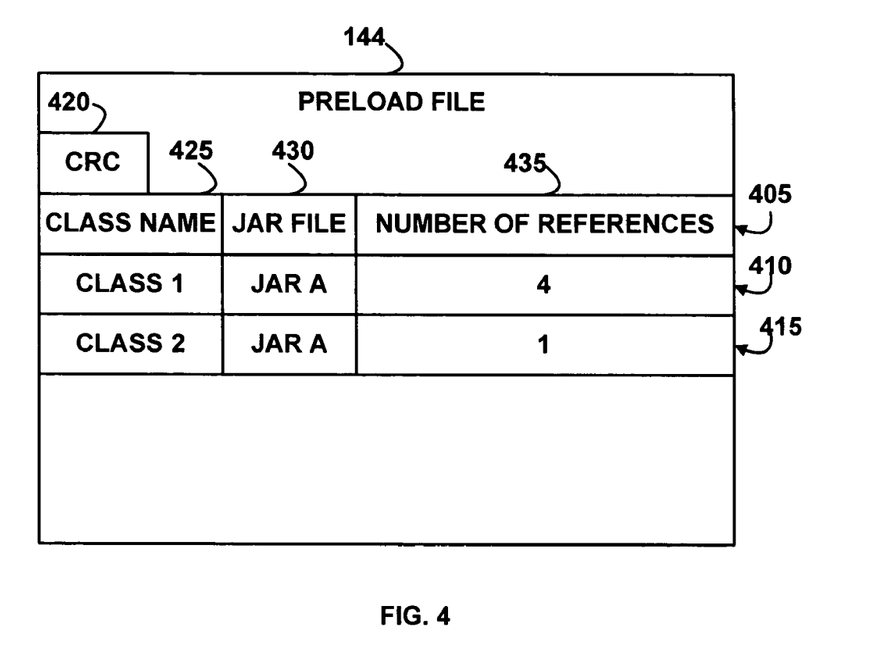
FIG. 4 depicts a block diagram of an example data structure for a preload file, according to an embodiment of the invention.

FIG. 4 depicts a block diagram of an example data structure for the preload file 144, according to an embodiment of the invention. The preload file 144 includes records 405, 410, and 415, but in other embodiments any number of records with any appropriate data may be included. Each of the records 405, 410, and 415 includes a class name field 425, a jar file name 430, and a number of references 435. The preload file 144 further includes a CRC (Cyclic Redundancy Check) field 420.

The class name 425 identifies a class that has been requested by the application 148. The jar file 430 indicates a container that contains the class identified by the associated class name 425. In an embodiment, the preload file 144 uses a convention where if the jar file field 430 does not contain an entry, then the associated class name 425 came from the jar file specified in the previous record.

The number of references 435 is the number of times that statements in the application 148 have requested the class name 425 to be loaded. The CRC 420 is a CRC of a class path associated with the class loader 150. In an embodiment, the CRC 420 is used to determine if the class path has changed since the records were created (from invocation to invocation of the application 148). But, in other embodiments the CRC 420 is not present, optional, or not used. A class path is an operating system environment variable used by the class loader 150. A class path can have multiple entries, which are used in sequence as search paths by the class loader 150. The class loader 150 uses the first matching entry that is found.

In other embodiments, the preload file 144 may include more or fewer elements than those illustrated. For example, the preload file 144 may include the class bytecodes of the class identified by the class name 425. In an embodiment, an interface to the preload file 144 may be provided that allows removal of classes that are no longer needed or valid and also the ability to view and edit the preload file 144.

Figure 5:
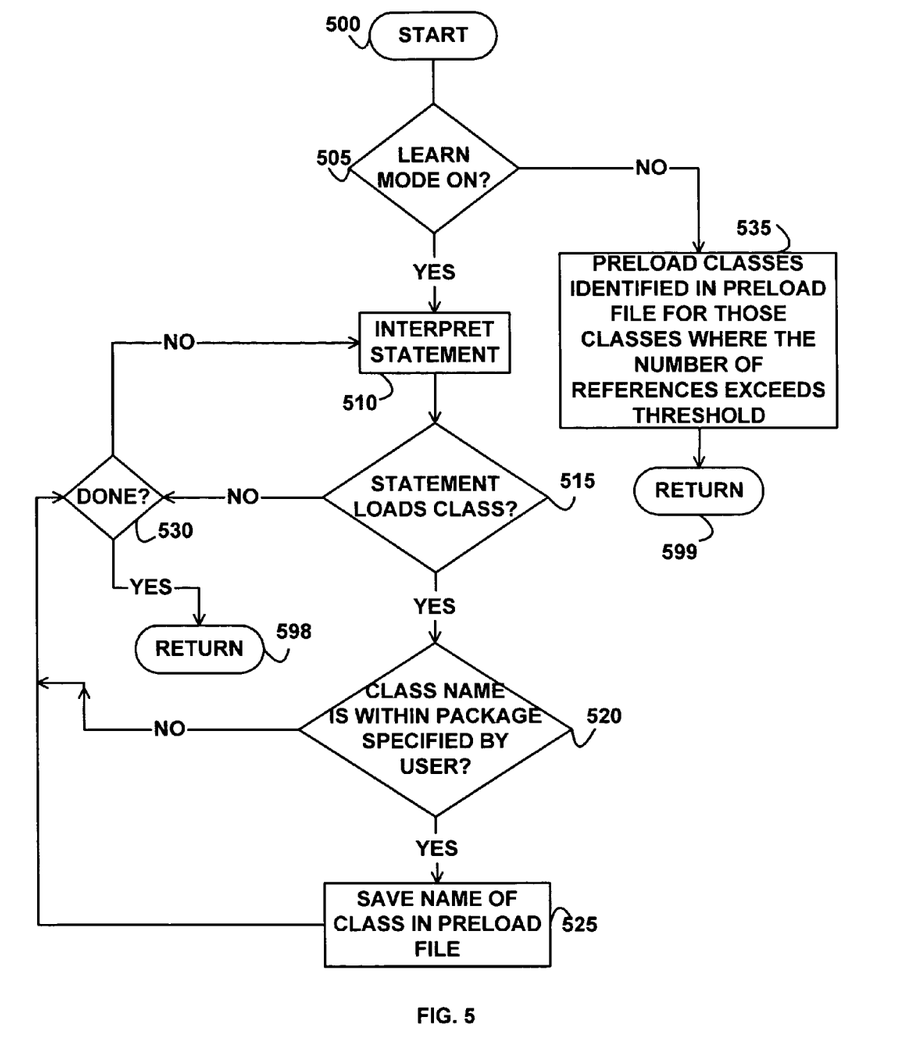
FIG. 5 depicts a flowchart of example processing for interpreting an application, according to an embodiment of the invention.

FIG. 5 depicts a flowchart of example processing for interpreting the application 148, according to an embodiment of the invention. Control begins at block 500. Control then continues to block 505 where the class loader 150 determines whether learn mode is on. Learn mode may be turned on as previously described above with reference to FIG. 2. If the determination at block 505 is true, then learn mode is on, so control continues to block 510 where the class loader 150 interprets the next statement in the application 148. Control then continues to block 515 where the class loader 150 determines whether the interpreted statement requests the loading of a class. If the determination at block 515 is true, then the interpreted statement does request a class to be loaded, so control continues to block 520 where the class loader 150 determine whether the class name specified by the interpreted statement in the application 148 is within a filter criteria 215 specified by the user (if the filter criteria 215 is used), as previously described above with reference to FIG. 2.

If the determination at block 520 is true, then the class name specified by the interpreted statement in the application 148 is within the filter criteria 215 specified by the user, so control continues to block 525 where the class loader 150 saves the name of the class specified in the interpreted statement into the class name 425 in the preload file 144. The class loader 150 may further save the name of the jar file that contains the class from the statement to the jar file 430 and a count of the number of references to this class name and jar file into the number of references field 435. In various embodiments, the preload file 144 may be initialized to empty at the start of every learn mode, or the records may accumulate across learn mode invocations. Control then continues to block 530 where the class loader 150 determines whether all of the statements in the application 148 have been interpreted. If the determination at block 530 is true, then control continues to block 598 where the logic of FIG. 5 returns.

If the determination at block 530 is false, then more statements in the application 148 remain to be interpreted, so control returns to block 510, as previously described above.

If the determination at bock 520 is false, then the class name specified by the interpreted statement in the application 148 is not within a package specified by the user, so control continues to block 530, as previously described above.

If the determination at block 515 is false, then the interpreted statement in the application 148 does not request the loading of a class, so control continues to block 530, as previously described above.

If the determination at block 505 is false, then learn mode is off in a subsequent invocation of the application 148, so control continues to block 535 where the class loader 150 preloads the classes identified in the preload file 144. In an embodiment, the class loader 150 preloads the class identified in the preload file 144 only if the associated number of references field 435 exceeds a threshold. In another embodiment, the number of references field 435 is ignored, not present, or not used. In an embodiment, the class loader 150 preloads the classes in a background thread, but in other embodiments, the class loader 150 may preload the classes inline in the current thread. Control then continues to block 599 where the logic of FIG. 5 returns.

Figure 6:
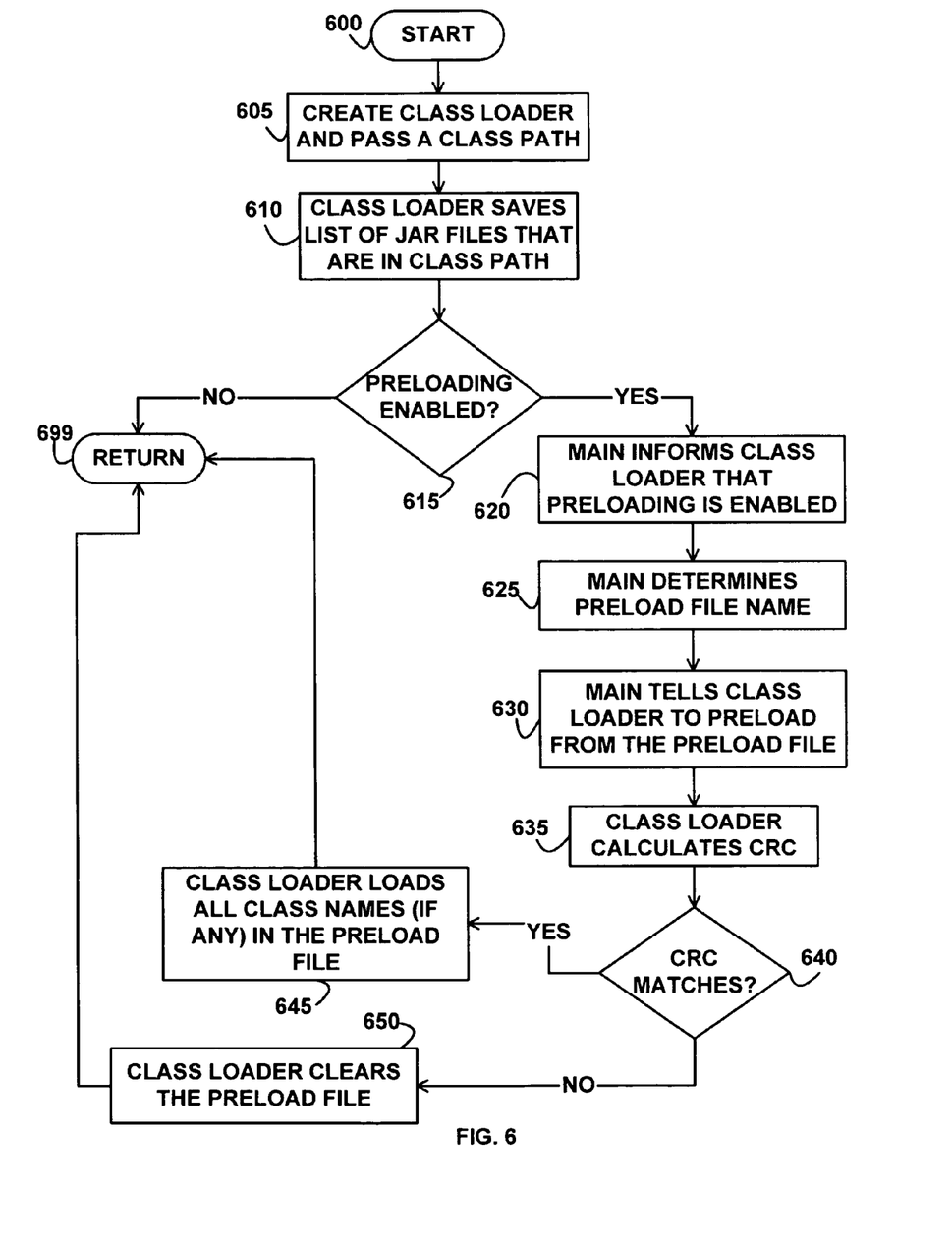
FIG. 6 depicts a flowchart of example processing for loading classes, according to an embodiment of the invention.

FIG. 6 depicts a flowchart of example processing for loading classes, according to an embodiment of the invention. Control begins at block 600. Control then continues to block 605 where the main 149 creates the class loader 150 and passes a class path to the class loader 150. Control then continues to block 610 where the class loader 150 saves a list of all the jar files that are in the passed class path. Control then continues to block 615 where the main 149 determines whether preloading is enabled, which may be enabled by a user or programmatically. In another embodiment, preloading is always enabled.

If the determination at block 615 is true, then preloading is enabled, so control continues to block 620 where the main 149 informs the class loader 150 that preloading is enabled. Control then continues to block 625 where the main 149 determines the name of a preload file 144. Control then continues to block 630 where the main 149 instructs the class loader 150 to preload all classes 425 that are specified in the determined preload file 144, which may be empty or may include any number of records. Control then continues to block 635 where the class loader 150 calculates the CRC of the class path, which was previously passed to the class loader 150 at block 605. Control then continues to block 640 where the class loader 150 determines whether the calculated CRC matches the CRC 420 in the preload file 144.

If the determination at block 640 is true, then the calculated CRC of the current class path matches the saved CRC 420, so control continues to block 645 where the class loader 150 loads all class names (if any) specified in the preload file 144. Thus, the class loader 150 preloads the classes on a subsequent invocation of the application 148 if the class path for the classes has not changed since the classes were needed in a previous invocation of the application 148. Control then continues to block 699 where the logic of FIG. 6 returns.

If the determination at block 640 is false, then the CRC of the current class path does not match the saved CRC 420, so the class path has changed since the records in the preload file 144 were created on a previous invocation of the application 148, so control continues to block 650 where the class loader 150 erases the records in the preload file 144. Control then continues to block 699 where the logic of FIG. 6 returns If the determination at block 615 is false, then preloading is not enabled, so control continues to block 699 where the logic of FIG. 6 returns.

Figure 7:
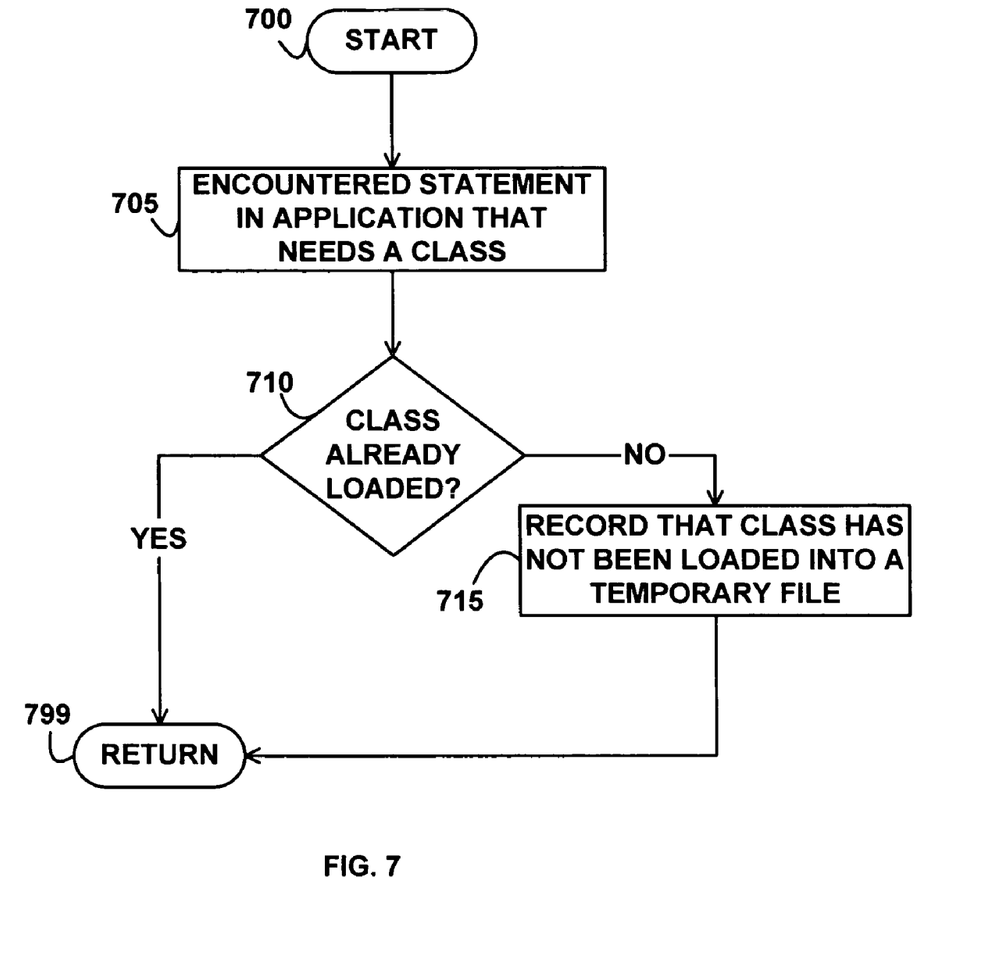
FIG. 7 depicts a flowchart of example processing for processing a statement in the application that needs a class loaded, according to an embodiment of the invention.

FIG. 7 depicts a flowchart of example processing for processing a statement in the application 148 that needs a class loaded, according to an embodiment of the invention. Control begins at block 700. Control then continues to block 705 where the class loader 150 determines that an encountered statement (e.g., the statement 310) in the application 148 needs a class. Control then continues to block 710 where the class loader 150 determines whether the needed class is already loaded.

If the determination at block 710 is true, then the class is already loaded and there is no need to load the class again, so control continues to block 799 where the logic of FIG. 7 returns.

If the determination at block 710 is false, then the class has not yet been loaded, so control continues to block 715 where the class loader 150 records that the class has not yet been loaded into a temporary file. Control then continues to block 799 where the logic of FIG. 7 returns.

Figure 8:
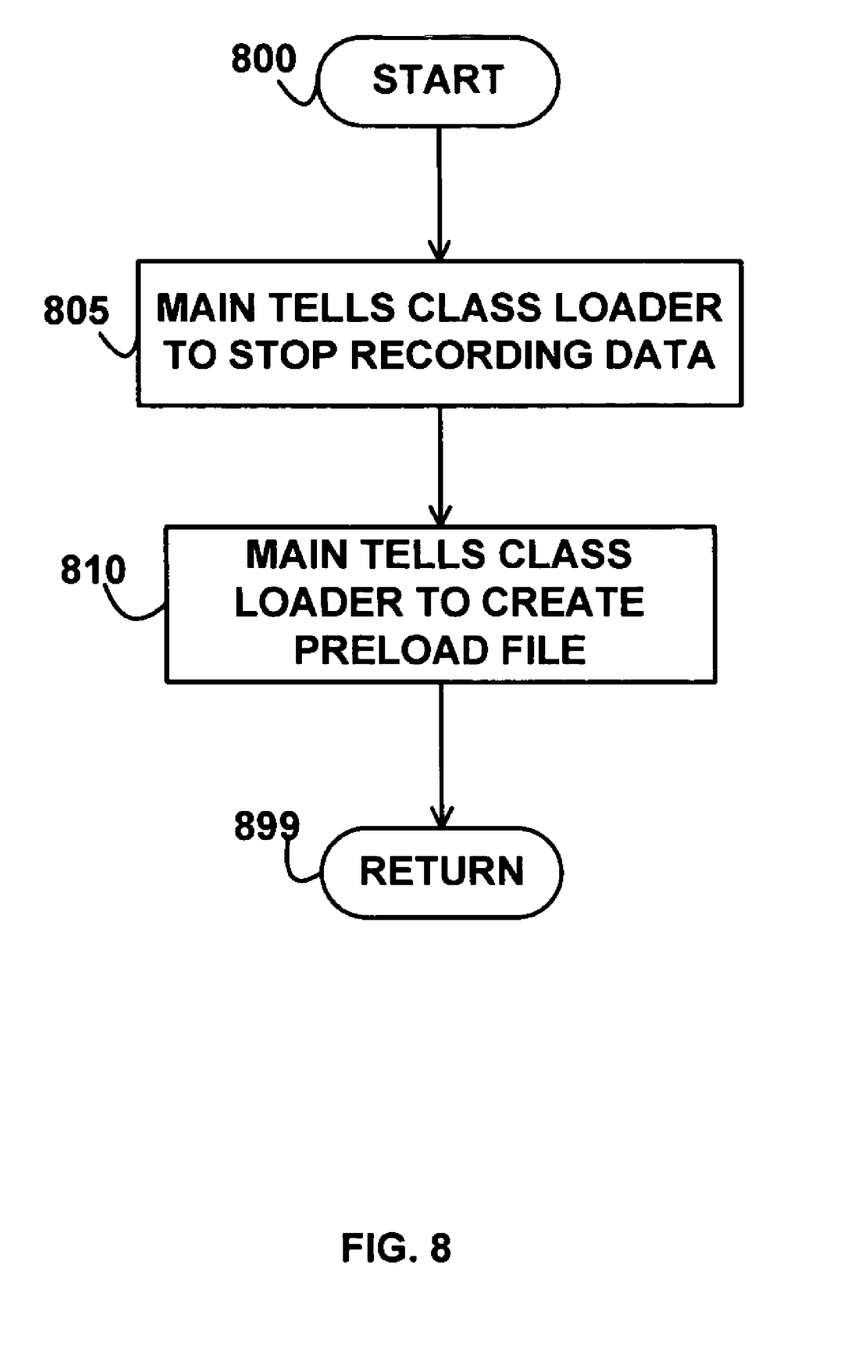
FIG. 8 depicts a flowchart of example processing for creating a preload file, according to an embodiment of the invention.

FIG. 8 depicts a flowchart of creating the preload file 144, according to an embodiment of the invention. Control begins at block 800. Control then continues to block 805 where the main 149 instructs the class loader 150 to stop recording data (the logic of FIG. 7 is recording data). Control then continues to block 810 where the main 149 instructs the class loader 150 to create the preload file 144. In response, the class loader 150 creates the preload file 144, as further described below with reference to FIG. 9. Control then continues to block 899 where the logic of FIG. 8 returns.

Figure 9:
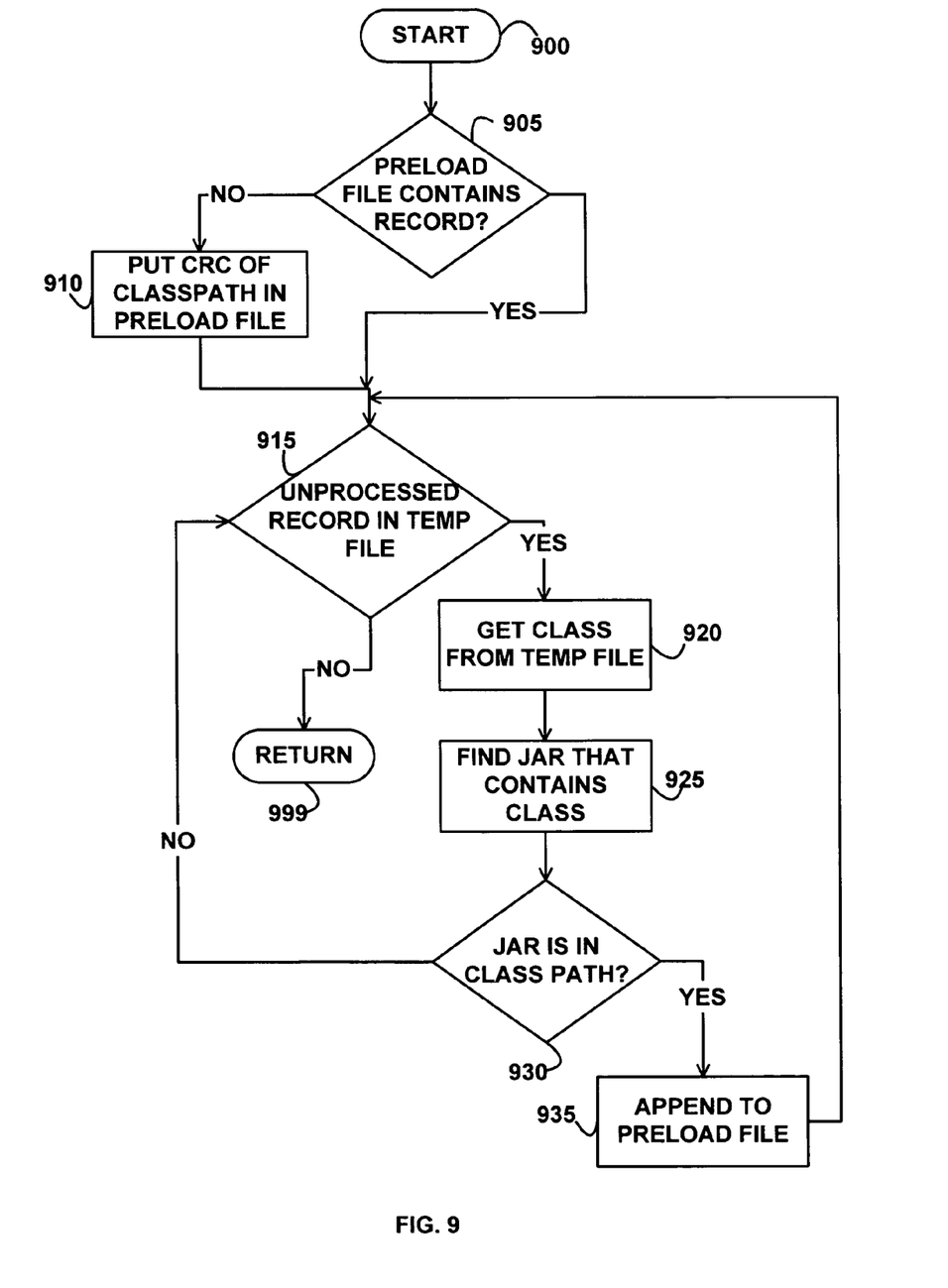
FIG. 9 depicts a flowchart of example processing for managing jar files, according to an embodiment of the invention.

FIG. 9 depicts a flowchart of example processing for managing jar files, according to an embodiment of the invention. Control begins at block 900. Control then continues to block 905 where the class loader 150 determines whether the preload file 144 contains a record. If the determination at block 905 is true, then the preload file 144 contains a record, so control continues to block 915 where the class loader 150 determines whether the temporary file contains a record unprocessed by the logic of FIG. 9.

If the determination at block 915 is true, then the temporary file does contain an unprocessed record, so control continues to block 920 where the class loader 150 retrieves the class from the record in the temporary file. Control then continues to block 925 where the class loader 150 finds the jar file that contains the class from the record in the temporary file. Control then continues to block 930 where the class loader 150 determines whether the jar file that contains the class is in the class path associated with the class loader 150.

If the determination at block 930 is true, then the jar file that contains the class is in the class path, so control continues to block 935 where the class loader 150 adds the class name and the jar file to the class name 425 and the jar file 430, respectively, to a new record in the preload file 144. In another embodiment, the logic of FIG. 9 may use the filter criteria 215 of FIG. 2 to select the classes that are appended to the preload file 144. Control then returns to block 915, as previously described above.

If the determination at block 930 is false, then the jar file that contains the class is not in the class path associated with the class loader 150, so control returns to block 915, as previously described above.

If the determination at block 915 is false, the all records in the temporary file have been processed, so control continues to block 999 where the logic of FIG. 9 returns.

If the determination at block 905 is false, then the preload file 144 does not contain a record, so control continues to block 910 where the class loader 150 calculates a CRC of the class path and stores it in the CRC 420 in the preload file 144. Control then continues to block 915, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   interpreting a plurality of statements during a first invocation of an application;
   determining a first plurality of classes that are requested to be loaded by the plurality of statements during the first invocation of the application and that meet a filter criteria specified by the user, wherein the filter criteria specifies a second plurality of classes that are to be included in the first plurality of classes, and wherein the filter criteria specifies a third plurality of classes that are to be excluded from the first plurality of classes;
   determining a plurality of jar files that contain the first plurality of classes during the first invocation of the application;
   counting a plurality of a number of references to the first plurality of respective classes by the plurality of statements during the first invocation of the application;
   deciding whether the plurality of jar files are in a class path during the first invocation of the application;
   determining whether each of the plurality of the number of the references to the first plurality of respective classes by the plurality of statements during the first invocation of the application is greater than a threshold;
   determining whether the class path has changed between the first invocation and a subsequent invocation of the application; and
   preloading the plurality of classes during the subsequent invocation of the application if the plurality of jar files were in the class path during the first invocation of the application, each of the plurality of the number of the references to the first plurality of respective classes by the plurality of statements during the first invocation of the application is greater than the threshold, and the class path has not changed between the first invocation and the subsequent invocation of the application.

2. The method of claim 1, wherein the determining whether the class path has changed between the first invocation and the subsequent invocation of the application further comprises:
   comparing a cyclic redundancy check of the class path from the first invocation and the subsequent invocation.

3. The method of claim 2, further comprising:
   refraining from preloading the first plurality of classes during the subsequent invocation of the application if the class path has changed between the first invocation and the subsequent invocation of the application.

4. The method of claim 3, wherein the filter criteria further specifies a package that contains the second plurality of classes that are to be included in the first plurality of classes, and wherein the filter criteria further specifies a directory that contains the third plurality of classes that are to be excluded from the first plurality of classes.

5. A method for configuring a computer, comprising:
   configuring the computer to interpret a plurality of statements during a first invocation of an application;
   configuring the computer to determine a first plurality of classes that are requested to be loaded by the plurality of statements during the first invocation of the application and that meet a filter criteria specified by the user, wherein the filter criteria specifies a second plurality of classes that are to be included in the first plurality of classes, and wherein the filter criteria specifies a third plurality of classes that are to be excluded from the first plurality of classes;
   configuring the computer to determine a plurality of jar files that contain the first plurality of classes during the first invocation of the application;
   configuring the computer to count a plurality of a number of references to the first plurality of respective classes by the plurality of statements during the first invocation of the application;
   configuring the computer to decide whether the plurality of jar files are in a class path during the first invocation of the application;
   configuring the computer to determine whether each of the plurality of the number of the references to the first plurality of respective classes by the plurality of statements during the first invocation of the application is greater than a threshold;
   configuring the computer to determine whether the class path has changed between the first invocation and a subsequent invocation of the application; and
   configuring the computer to preload the plurality of classes during the subsequent invocation of the application if the plurality of jar files were in the class path during the first invocation of the application, each of the plurality of the number of the references to the first plurality of respective classes by the plurality of statements during the first invocation of the application is greater than the threshold, and the class path has not changed between the first invocation and the subsequent invocation of the application.

6. The method of claim 5, wherein the configuring the computer to determine whether the class path has changed between the first invocation and the subsequent invocation of the application further comprises:
   configuring the computer to compare a cyclic redundancy check of the class path from the first invocation and the subsequent invocation.

7. The method of claim 6, further comprising:
   configuring the computer to refrain from, preloading the first plurality of classes during the subsequent invocation of the application if the class path has changed between the first invocation and the subsequent invocation of the application.

8. The method of claim 7, wherein the filter criteria further specifies a package that contains the second plurality of classes that are to be included in the first plurality of classes, and wherein the filter criteria further specifies a directory that contains the third plurality of classes that are to be excluded from the first plurality of classes.

* * * * *